March 20, 1928.

H. P. HANSON

WATER BOWL FOR STOCK

Filed June 26, 1925 2 Sheets-Sheet 1

WITNESSES
Chas. L. McDonald
E. N. Lovewell

INVENTOR
Haakon P. Hanson

BY E. G. Siggers

ATTORNEY

March 20, 1928. 1,663,340
H. P. HANSON
WATER BOWL FOR STOCK
Filed June 26, 1925 2 Sheets-Sheet 2
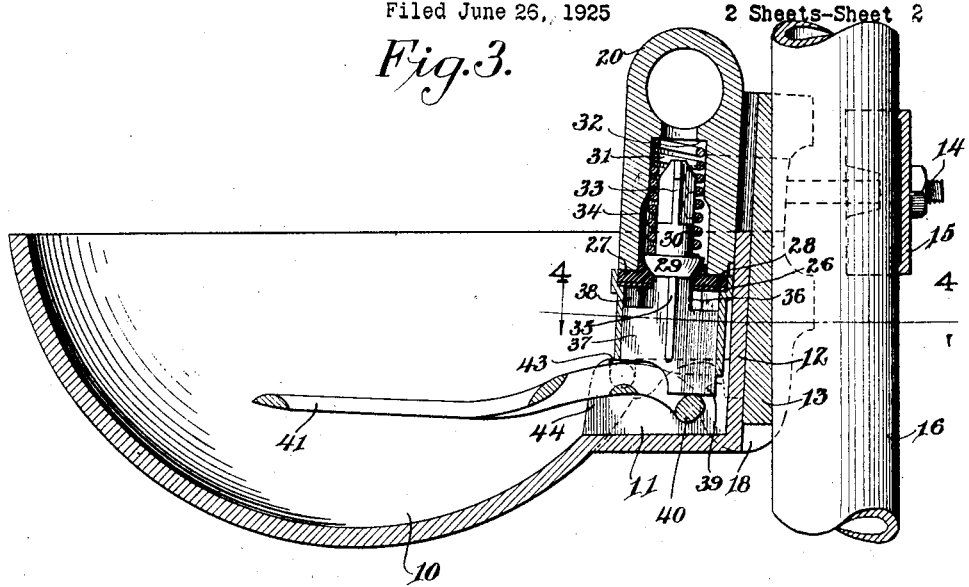
Fig. 3.
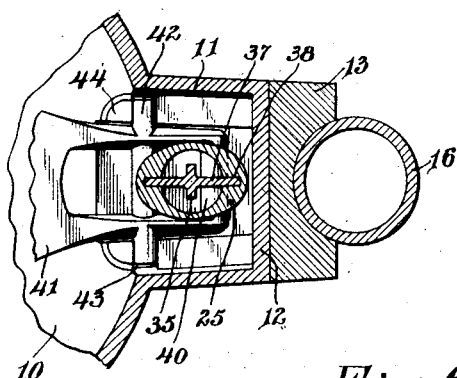
Fig. 4.
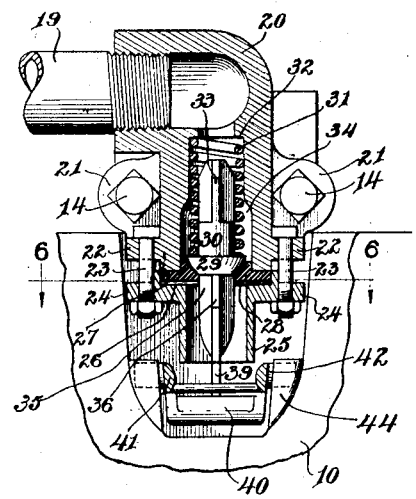
Fig. 5.
Fig. 6.
WITNESSES
Chas. L. McDonald
E. N. Lovewell
INVENTOR
Haakon P. Hanson
BY
E. G. Siggers
ATTORNEY Patented Mar. 20, 1928.

1,663,340

UNITED STATES PATENT OFFICE.

HAAKON P. HANSON, OF ALBERT LEA, MINNESOTA, ASSIGNOR TO OLSON MANUFACTURING COMPANY, OF ALBERT LEA, MINNESOTA, A CORPORATION OF MINNESOTA.

WATER BOWL FOR STOCK.

Application filed June 26, 1925. Serial No. 39,761.

This invention relates to a water bowl for stock, which is provided with a valve adapted to be actuated by the nose of the animal to furnish a supply of water while the animal is drinking, and adapted to be automatically closed as soon as the animal's nose is withdrawn.

One of the most important objects of the invention is to provide a valve of improved construction, and improved means for guiding the same, so that it will be quickly responsive to pressure applied to its actuating lever and will, as soon as released, become accurately seated so as not to leak.

The valve is made in one piece, preferably of brass, with a stem projecting both upwardly and downwardly from its head and accurately guided, the lower end of the stem being provided with an integral extension which is engaged by a lever to lift the valve from its seat. The peripheral portion of the lower face of the valve head is rounded, and the seat which it engages is preferably made of soft rubber.

The invention also includes improvements in the form and arrangement of the bowl, the bracket supporting the same, and the supply pipe fittings, whereby their cooperation is promoted, and their assemblage facilitated.

The above and other objects and advantages will be more particularly explained in connection with the accompanying drawings, which illustrate one embodiment of the invention.

In the drawings:

Figure 3 is a vertical section taken on the line 3—3 of Figure 1.

Figure 4 is a fragmentary section taken on the line 4—4 of Figure 3.

Figure 5 is a vertical section through the valve housing taken at right angles to the plane of Figure 3.

Figure 6 is a section taken on the line 6—6 of Figure 5.

Figure 1:
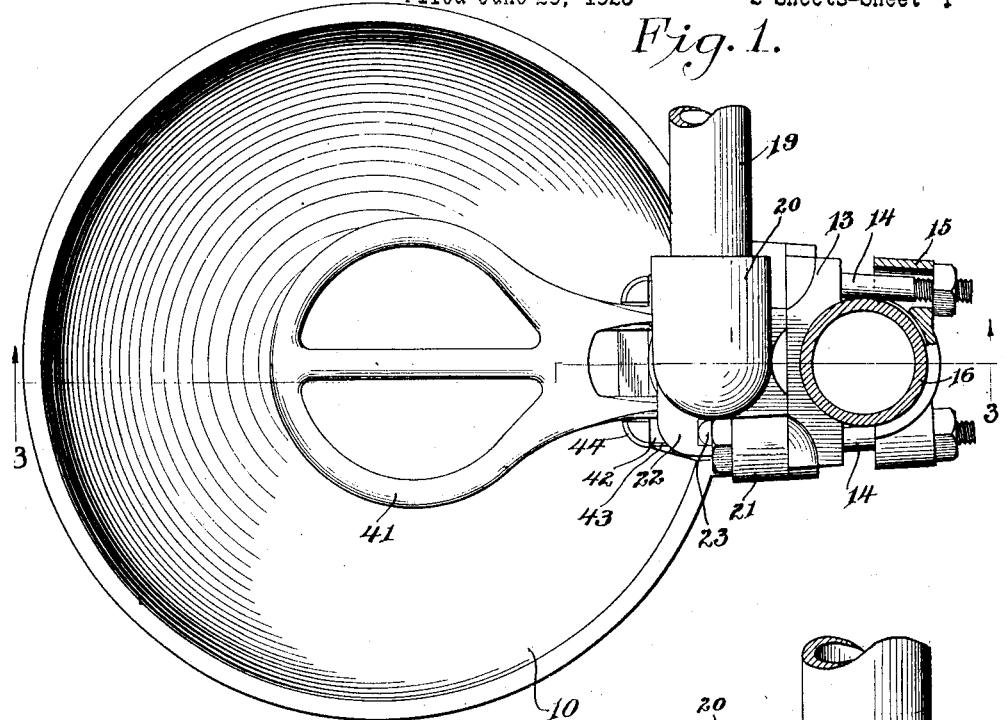
Figure 1 is a plan view of the bowl, with a portion of the supporting means shown in section.
Figure 2:
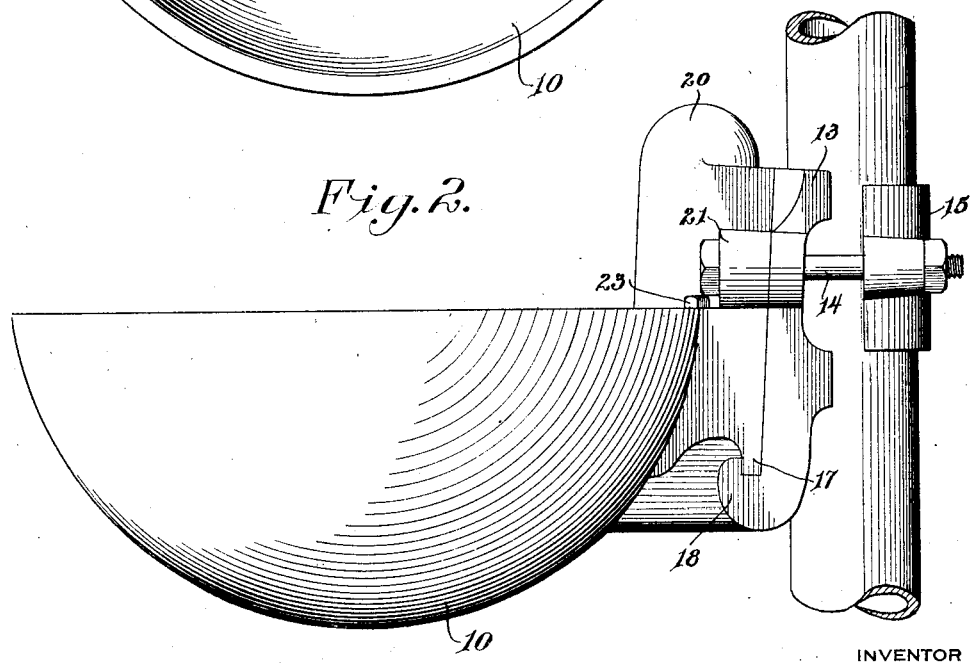
Figure 2 is a side elevation thereof.

Referring in detail to the drawings, the invention comprises a bowl-shaped receptacle 10 made from cast aluminum, or other suitable material, and adapted to contain water. This receptacle is formed at its rear side with a recess 11, having a flat rear wall 12, which is adapted to bear against the flat face of a supporting bracket 13, the latter being secured by bolts 14 and a clamping member 15 to an upright pipe 16, or other suitable support. The side walls of the recess 11 are formed with laterally offset portions having downwardly extending ears or lugs 17, adapted to be received by hooks 18 formed at the lower end of the bracket 13.

Water is supplied to the bowl 10 through a supply pipe 19, which is connected to an elbow 20 of special construction having a depending portion forming a valve housing, and having laterally extending ears 21, which are secured underneath the heads of the bolts 14. At or near the lower end of the elbow 20 and below the ears 21 are formed lateral projections 22, which are connected by bolts 23 to opposed lateral projections 24, extending from an outlet or mouth portion 25 forming an extension of the valve housing. A valve seat 27, of rubber or similar material, rests on a washer 28, and the valve seat and washer are clamped between the lower end of the elbow 20 and an annular channel 26 formed at the upper end of the extension 25. Thus the member 27 serves both as a valve seat and as a packing joint, thus reducing the cost of manufacture.

The valve head 29 has its peripheral portion rounded and tapered inwardly so as to seat tightly on the seat 27, and the valve stem 30 extends upwardly and downwardly from the head 29. The valve is normally held on its seat by an expansile coiled spring 31, which surrounds and guides the stem 30 above the head 29, and acts between the latter and a shoulder 32 formed at the upper end of the valve housing. The upper portion of the stem 30 is formed with channels 33, and the lower part of the elbow 20 is enlarged, as at 34, to provide sufficient room for the passage of the water around the valve head when the valve is lifted. The portion of the valve stem which extends below the head 29 is formed with vanes 35 and 36, which guide the valve vertically when it is raised, and provide passageways for the water through the opening in the valve seat. The lower portions of the vanes 36 are extended laterally, as shown at 37, and these laterally extended portions are guided in channels 38 formed in the sides of the extended portion 25 of the valve housing. One of the guide portions 37 also has an integral downward extension 39, the end of which is engageable by an abutment 40 formed at the inner end of a lever 41. This lever is in the form of a skeleton frame having laterally extending trunnions 42, which rest in seats 43 formed at the upper ends of lugs 44 located at the sides of the recess 11.

It will be understood that the nose of an animal when drinking will be pressed against the outer portion of the lever 41 to rock the same on the trunnions 42, thereby lifting the valve and permitting the water to run into the bowl. The valve is accurately guided by the stem which extends both upwardly and downwardly from the valve head, and by the extended guide portions 37 which reciprocate in the channels 38. As soon as the outer end of the lever 41 is released, the valve is immediately returned to its seat by the spring 31. The valve head and stem, together with the extended portions 37 and 39, are made in one integral piece, preferably of brass. In assembling the valve and valve seat, the washer 28 is split, as shown at 45, Figure 6, and may be sprung apart sufficiently to be passed over the end of the valve stem, after which it is restored to its original form. The rubber seat 27 may be stretched sufficiently to pass over the head 29. By making the valve entirely of metal, and the valve seat of rubber, the latter is securely held in position, and will not be likely to become injured or destroyed. The entire valve housing, valve seat, and valve are held in assembled relation by the bolts 23, while the bolts 14 serve to secure both the bracket 31 and the valve housing to the support 15. The housing, when thus secured, engages the rear wall of the recess 11 and the ears 21 extend over the upper edges of the side walls of the recess so that the bowl 10 is securely held in its position. The operating lever 41 rests with the trunnions 42 loosely engaging the seats 43 and is retained against accidental removal by the downwardly projecting extension 25. Thus the entire assembly of the bracket 13, housing 20, bowl 10 and lever 41 is effected by means of the bolts 14.

While I have shown and described the detailed construction of the invention in what is now regarded as its preferred embodiment, it will be apparent that various modifications may be made in the form and arrangement of the various parts without any material departure from the salient features of the invention. It is, therefore, my intention to include all such modifications within the scope of the claims.

What is claimed is:

1. In a device of the character described, the combination of a receptacle formed with a rearwardly disposed recess, the outer faces of the sides of said recess being formed with depending lugs a bracket for supporting said receptacle having hooks for receiving said lugs a water supply member including a valve housing, means for securing the water supply member to the bracket and in engagement with a wall of said recess to lock the receptacle to said bracket, a valve seat, a valve within said housing, a lever mounted within the receptacle and operable to lift the valve from its seat, and means for returning the valve to its seat as soon as the lever is released.

2. In a device of the character described, the combination of a receptacle formed with a rearwardly disposed recess, the outer faces of the sides of said recess being formed with depending lugs, a bracket for supporting said receptacle having hooks for receiving said lugs, a water supply member including a valve housing, means for securing said member to the bracket and in engagement with a wall of said recess to lock the receptacle to said bracket, a valve seat, a valve within said housing, said valve having a stem with a depending portion, a lever engageable with said depending portion to lift the valve from its seat, said lever having trunnions intermediate its ends, lugs on the sides of the receptacle having seats in which said trunnions rest, being retained therein by the lower portion of said housing, and spring means for returning the valve to its seat as soon as the lever is released.

3. In a device of the character described, the combination of a receptacle formed with a rearwardly disposed recess, the outer faces of the sides of said recess being formed with depending lugs, a bracket for supporting said receptacle having hooks for receiving said lugs, a water supply member including a valve housing, means for securing said member to the bracket and in engagement with a wall of said recess to lock the receptacle to the bracket, said housing having a removable extension, a valve seat clamped between the main portion of the housing and said extension, a valve on said seat having a stem with a depending portion, a lever with its rear end engaging said depending portion of the valve stem and having trunnions intermediate its ends, lugs at the sides of said recess having seats in which said trunnions rest, the latter being retained therein by said housing extension, the front end of said lever extending into the central part of the receptacle and being depressible to lift the valve from its seat, and means for restoring the valve to its seat as soon as the lever is released.

4. In a device of the character described, the combination of a receptacle, a water supply member therefor including a valve housing secured above the receptacle, said housing having an extension removably secured to its lower end and constituting an outlet mouth, a valve seat clamped between the main portion of the housing and said extension, a valve head normally engaging said seat and having a stem extending upwardly and downwardly from the head, vanes extending laterally from the valve stem, said extension having channels in which certain of said vanes are guided, means engageable with the lower end of one of said vanes and operable to lift the valve from its seat, and spring means for returning the valve to its seat as soon as the first-mentioned means is released.

In testimony, that I claim the foregoing as my own, I have hereto affixed my signature.

HAAKON P. HANSON.